July 12, 1927. 1,635,447
W. W. VOSPER
CUTTING TOOL MOUNTING AND CONTROLLER
Filed Oct. 29, 1925 2 Sheets-Sheet 2
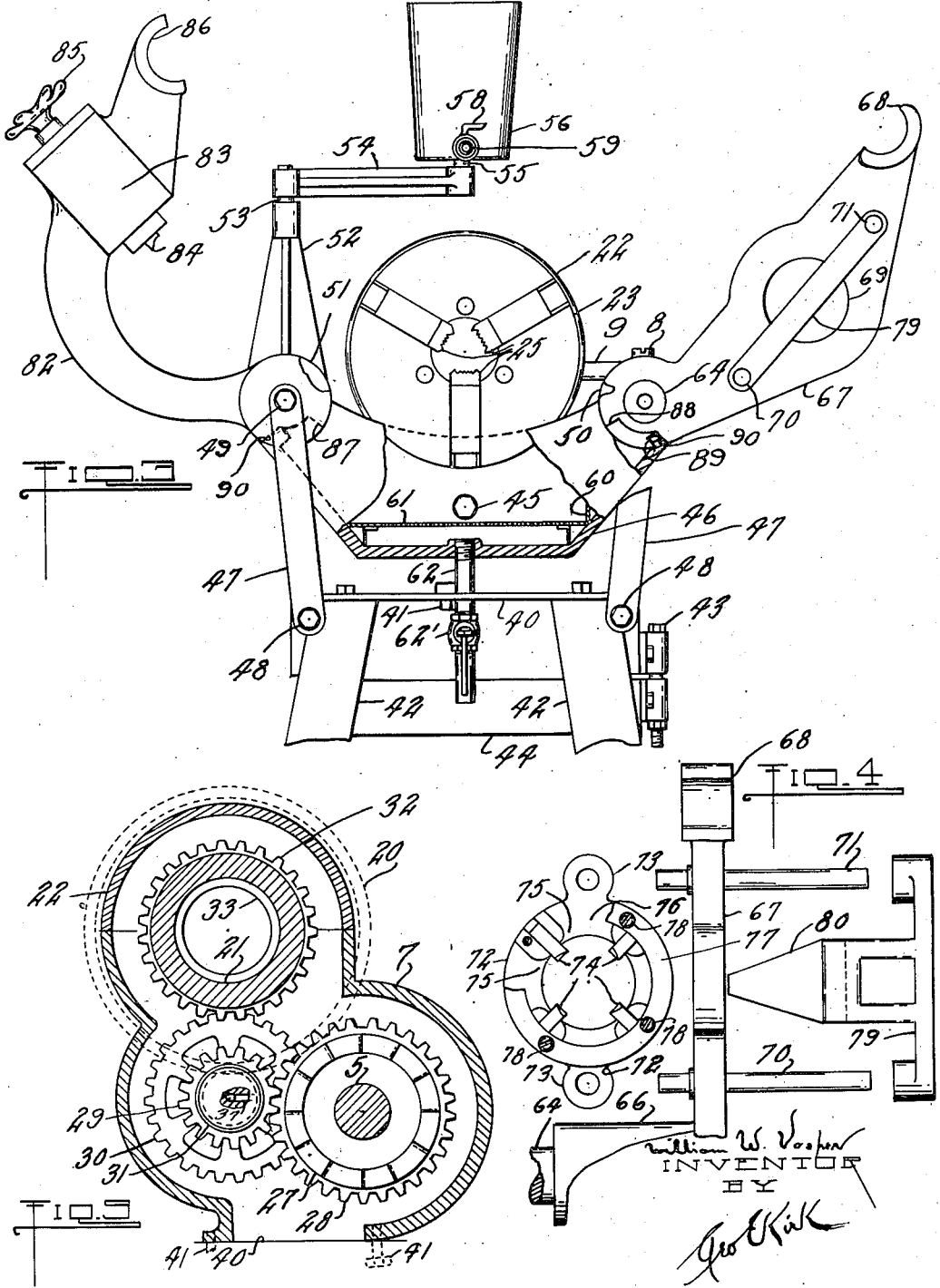

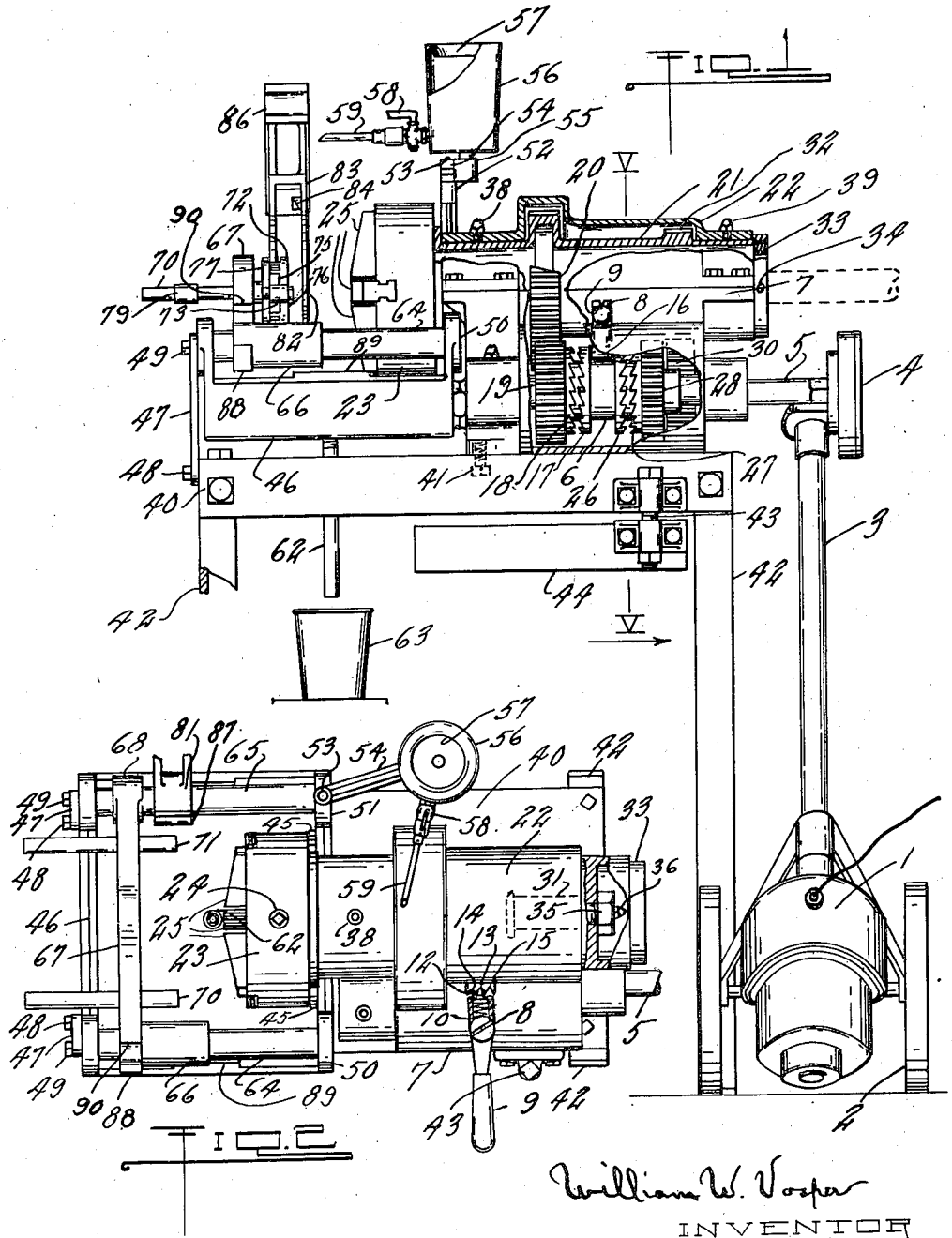

Patented July 12, 1927.

1,635,447

UNITED STATES PATENT OFFICE.

WILLIAM W. VOSPER, OF TOLEDO, OHIO, ASSIGNOR TO THE TOLEDO PIPE THREADING & MACHINE CO., OF TOLEDO, OHIO, A CORPORATION OF OHIO.

CUTTING-TOOL MOUNTING AND CONTROLLER.

Application filed October 29, 1925. Serial No. 65,626.

This invention relates to anchoring work and operating thereon by cutting tools during relative rotation between said work and tools.

This invention has utility when incorporated in pipe threading and cutting equipment especially as for power drive.

Referring to the drawings:

Fig. 1 is a side view, with parts broken away, of an embodiment of the invention in a power driven apparatus;

Fig. 2 is a plan view of the apparatus of Fig. 1, parts being broken away;

Fig. 3 is an end view of the apparatus of Fig. 1 showing the tools swung away from operative position;

Fig. 4 is a distributed view of the threading cutter, reamer and mounting; and

Fig. 5 is a section on the line V—V, Fig. 1.

Motor 1 as mounted on truck 2 is effective through shaft 3 and driving plate 4 to rotate shaft 5 having collar 6 splined thereon. Housing 7 for the transmission and into which the shaft 5 extends carries fulcrum pin 8 for lever 9 having socket 10 in which is disposed spring 11 normally thrusting nose 12 into central neutral seat 13 or lateral seats 14, 15, for yieldably holding the lever 9 into such adjusted position. This lever 9 carries depending portion 16 coacting with the collar 6 for throwing jaw clutch member 17 into driving engagement with jaw clutch member 18. Fast with this jaw clutch member 18 is gear 19 loosely mounted on the shaft 5 and in mesh with gear 20 on sleeve 21 in upper housing member 22 carrying disk 23 having screws 24 rotatable for adjusting chuck jaws 25 into engaging or releasing position as to the piece of work, as an external cylindrical rod, bar, or pipe. This may be the low speed forward or thread cutting rotation for the tool.

If the lever 9 be rocked in the reverse direction, the clutch collar 6 has its jaw clutch 26 thrown into meshing relation with jaw clutch member 27 fast with gear 28 loosely mounted on the shaft 5. This gear 28 is in mesh with pinion 29 fixed with gear 30 loosely mounted on stub shaft 31 carried by the housing 7. This gear 30 is in mesh with gear 32 on the rotary work holder sleeve 21 and provides through this speed up gearing, a high speed of reverse rotation for this holder 21 as having the work clamping means or chuck 25 at one end and centering guide 33 at the opposite end as locked in position by set screw 34. Nut 35 positions shaft 31 in the frame or housing 7. Oil cup 36 is effective through duct 37 for lubricating this intermediate shaft 31 carrying the gears 29, 30. Oil hole closures 38, 39, in upper housing member 22 lubricates the bearings in the housing 7, 22, for this rotary work holder. This housing 7 is herein shown as mounted on bench 40 by bolts 41. This bench or table 40 is provided with legs 42 and pivot bolt 43 carrying tray 44 in which substitute guides 33, as well as dies or cutting tools with their yokes, may be placed. This tray 44 is conveniently swingable into position under the deck 40 of this bench or table, when out of use, so that the bench serves as a closure therefor.

Bolts 45, coacting with the housing 7 remote from the driving end of the shaft 5, mount pan 46 with the housing 7, while bars 47 fixed with the remote end of such pan 46 are anchored by bolts 48 with the bench or table. The upper ends of these bars 47 are fixed to the pan by bolts 49. This pan 46 has adjacent the housing 7, ears 50, 51. From the ear 51 arises bracket 52 carrying in its upper portion, vertical pivot pin 53 from which extends radial arm 54 having pivot pin 55 mounting oil cup 56 having overhang rim 57 at its upper portion to minimize slop of oil upon quick swinging of this cup into and out of operative position. Valve 58 controls flow of screw cutting oil or lubricant from the cup 56 by duct 59 to be spilled on to the operating part of the work to keep down the temperature, as well as lubricate the tools. Such liquid, as passing from the work, spills into supplemental tray 60 having perforate bottom 61. This tray 60 is disposed in the pan 46 and operates as a strainer to hold the turnings from the metal or work acted upon, while allowing the liquid to pass into the bottom of the pan and flow from thence by duct 62 as controlled by valve 62' to be gathered in pail 63 below this table and thus permit resupply of the liquid by pouring into the cup 56.

From the ears 50, 51, toward the bolts 49, are bars 64, 65, as guides, parallel to each other and parallel to the axis extended of the rotary work holder 21 determining a plane to one side of the axis of the said work holder 21. Accordingly, the horizontal plane through the axis of the work holder 21 is above these guides 64, 65. The guide 64 has sleeve 66 loose thereon so that it may freely rock and slide. This sleeve 66 has integral yoke extension 67 terminating in seat 68 which in the position of this yoke extension 67, as a holder, when swung toward the guide 65, will rest on such guide 65. This yoke holder 67 has central opening 69, which in rest position of this yoke or holder has its axis coincident with the axis of the rotary holder 21. This rockable holder 67 carries pins 70, 71, protruding therethrough. Upon the side of this yoke 67 toward the chuck or rotary work holder there may be mounted supplemental carrier 72 having ears 73 perforate for sliding into position on the pins 70, 71, and thereby mounting this supplemental carrier 72 having an annular series of dies 74 being chasers in sequence for thread cutting operation. This supplemental carrier 72 has clearance space 75 between its base ring 76 and die anchoring ring 77 as held in position by screws 78. This region of clearance permits the dropping of screw cutting oil or lubricant from the duct 59 through one of these openings 75 directly upon the cutting region of the work, while the turned off metal may also clear this supplemental carrier and readily drop into the tray 60 without any clogging of the tool. The pins 70, 71, permit ready replacement of this tool as to the dies for the desired pitch of thread or diameter in the working operations.

In the event the work is tubular, as pipe, and it is desired to chamfer or ream out the ends of the pipe in the region of the portion which is externally threaded, the pins 70, 71, may have slidably mounted thereon remote from the rotary holder 21, yoke 79 carrying cutting tongue 80 which, as entering the pipe, will, during the relative rotation of the pipe, shave or cut off a bevel inward of said open end and from such initial thrust position will gradually work out automatically as the chamfer or cut is completed. During the continuance of the threading operation effected for starting by shoving the carrier 72 into the rotating work, the dies as engaging will automatically feed into the work and the yoke 67 slide along the guides 64, 65, during this slow speed cutting operation. The taper of the tongue 80 is sufficient to care for a range of sizes of the pipe.

On the guide 65 is loosely mounted sleeve 81 having arm 82 carrying guide 83 for cutting tool 84 adjusted by hand wheel 85. Terminally, this arm 82 has seat 86 which in operative position of the tool is against guide 64 as a rest.

Referring to Fig. 3, the cutting operation has occurred with the work rotating counterclockwise thus effecting the clockwise or right hand threading of the work. This counterclockwise rotation tends to pull the yoke 67 down upon the rest 65. This thread cutting operation has occurred through the slow speed transmission of the gears 19, 20. For backing off the threading tool from the work, the lever 9 is rocked to reverse for the high speed driving of the rotary holder through the gear 30. This is in the reverse or clockwise direction. Furthermore, this is the direction wherein the cutting tool is used and in such use, the direction of rotation tends to hold the seat 86 against the guide 64. In this cutting operation, there is no travel of the cutter along the guides 64, 65.

The sleeve 81 is provided with lug 87 requiring the tilting of this cutter carrier outward, when the thread cutter is down in position, to give guide clearance. Further, as the thread cutter travels, this lug 87 precludes any throwing of the arm 82 into operative position. Furthermore, the sleeve 66 has lug 88 coacting with ledge 89 on the pan 46 to hold this yoke 67 out of operative position when shoved clear of seat 86 to allow such to rest on the guide 64. In this outwardly or open position of the yoke 67 and the arm 82, lugs 90 rest against the outer upper edge of the pan 46 and thus limit the outer swing of these tool carrier devices.

In operation, it is only necessary to couple the driving plate 4 to the shaft 5, or otherwise supply power thereto by a direct connected motor. Such shaft 5 may be running idly with the lever 9 in the neutral or central seat 13. With the pipe as the article of work disposed in the rotary holder 21, the lever 9 may be turned to effect driving through the jaw clutch 17, 18, for the slow speed rotation of such work. The supplemental carrier 72 is on pins 70, 71, of yoke 67. The seat 68 slidably coacts with the guide 65. Such work and tool are brought into abutting relation by shoving the yoke 67 manually to have the dies 74 engage with the pipe. This shove may be on the yoke 79 instead of on the yoke 67 for simultaneously effecting a reaming of the pipe. As the threads take hold, the feed, at say 24 R. P. M. up to 40 R. P. M. according to the size of pipe, may be completed. The lever 9 may be turned into the reverse direction to back off the holder 67, the reamer having automatically worked itself out prior thereto. As the threading tool has thus been high speed worked off, the position of the pipe say for cutting a length or short nipple may be determined by releasing the chuck and feeding the pipe up. This cutting of the pipe by the tool 84 may occur close up to the chuck disk 23 and thereby the machine has advantage of the single mounting and holding means for minimizing possible vibration during the cutting operation. The proportioning of the parts is such that the cut off for the pipe may be of a desired length permitting the single chucking or locking of the pipe for the cutting to leave such pipe ready for the threading operation. Accordingly, this structure is one permitting speed of manipulation with advantages of superior cutting operations incidental thereto.

What is claimed and it is desired to secure by United States Letters Patent is:

1. A rotary work holder, a pair of parallel guides parallel to the axis of the holder and on one side of a plane through the axis of said rotary holder, a tool carrier slidably mounted on one of said guides and swingable through said plane to rest on the other guide, a tool mounted in the tool carrier, and means for rotating the work holder through the action of the work on the tool tending to urge the tool-carrier-mounting guide through said plane toward the rest guide of said tool carrier for effecting automatical holding of said tool carrier into the work.

2. A rotary work holder, a pair of parallel guides parallel to the axis of the holder, and one side of a plane through the axis of said rotary work holder, a tool carrier slidably mounted on one side of said guides and swingable through said plane to rest on the other guide, a threading tool mounted in the tool carrier, means for rotating one of said holders for thereby causing progressing of the other holder along said guide toward the one, and a plurality of chasers in sequence establishing a pitch and mounted in the tool carrier.

3. A rotary work holder, a pair of guides parallel to the axis extended of said rotary holder and below the horizontal plane of said axis, a threading tool holder mounted on one of said guides, a cutting tool holder mounted on the other of said guides, said tool holder in working position swingable against the other guide as a seat, and control means precluding simultaneous positioning of both holders for working operation.

4. A rotary work holder, a pair of guides parallel to the axis extended of said rotary holder and below the horizontal plane of said axis, a threading tool holder mounted on one of said guides, a cutting tool holder mounted on the other of said guides, said tool holder in working position swingable against the other guide as a seat, and driving means for rotating the rotary holder in one direction for thread cutting operation and in the reverse direction for a tool operation in backing off the work whereby the work rotation as to the operative tool is upward from the guide on which the tool is mounted.

5. A rotary holder, guide means eccentric thereof and extending therebeyond, a non-rotary holder hinged to said guide means and swingable thereon toward and from the axis of said rotary holder, means on one of said holders for supporting work, a tool carried by the other holder for coacting with work supported effective for progressing one holder along the guide as to the other holder, and control means adjacent the guide coacting to preclude swinging of the non-rotary holder toward the rotary holder and thus render the tool inactive.

6. A work holder, a pair of parallel guides parallel to the axis of the holder and one side of the axis of said work holder with said work holder disposed intermediate said guides, a tool carrier slidably mounted on one of said guides and swingable to rest on the other guide, a threading tool mounted in the tool carrier, and means for rotating one of said holders for thereby causing progressing of the other holder along said guide.

7. A rotary work holder, a series of thread cutting chasers, a ring carrier for the chasers having a pair of eyes, a mounting having a pair of rods laterally of the axis extended of said holder upon which rods the chaser carrier ring is mounted by said eyes, and a rest from which the mounting is swingable into working position as to the work.

8. A rotary pipe holder, a thread cutter mounted laterally of the axis extended of said holder, a rest from which the cutter is swingable into working position as to the pipe, mounting means for the cutter whereby the thread cutter as coacting with the pipe is effective for feeding the cutter along the pipe, and a cutter tongue slidably mounted with the thread cutter and shiftable into pipe reaming position as to the pipe during thread cutter operation.

In witness whereof I affix my signature.

WILLIAM W. VOSPER.